Patented Mar. 18, 1947

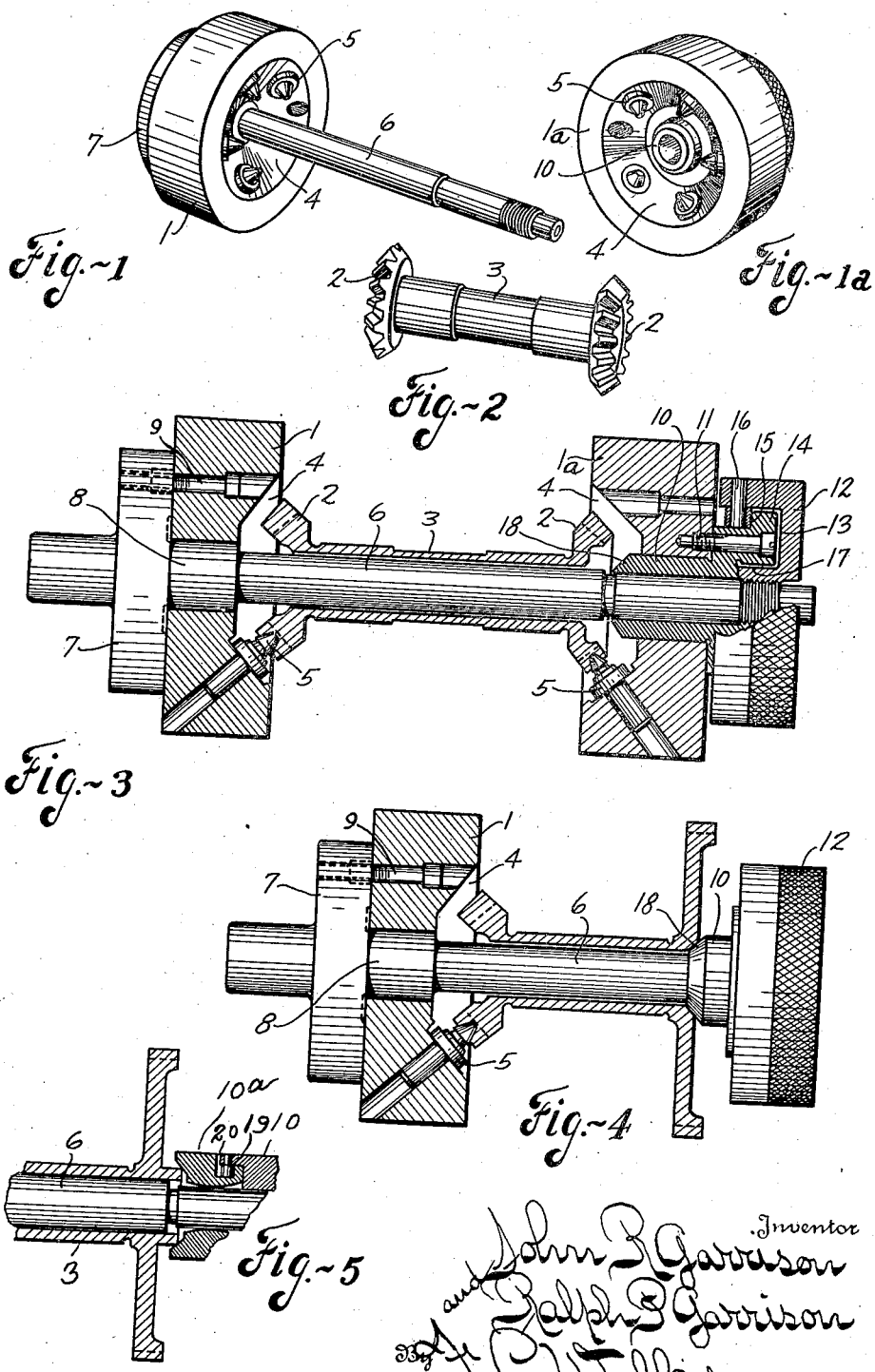

2,417,409

UNITED STATES PATENT OFFICE 2,417,409

GEAR CHUCK

John R. Garrison and Ralph P. Garrison, Dayton, Ohio, assignors to Garrison Machine Works, Inc., Dayton, Ohio, a corporation of Ohio Application November 3, 1941, Serial No. 417,722

5 Claims. (Cl. 51—237)

This invention pertains to precision work holders or supports, and more particularly to an automatically centering chuck or fixture for temporarily holding elongated work parts and machine elements in axially aligned position during performance of machining operations thereon.

For illustrative purposes, but with no intent to unduly restrict or limit the scope of the invention or its application, it is herein shown and described as embodied in a duplex gear chuck for bevel gear clusters, wherein the work part is accurately located for cylindrical grinding or other precision operation, by the pitch lines of relatively spaced gear pinions or by the pitch line of one gear and a distant axially aligned center. The work holder or chuck is adapted to be used between centers of a cylindrical grinder, where it insures that all cylindrical surfaces and shoulders will be ground concentric with each other and with the pitch line of the gear, and that all other finished surfaces shall be accurately formed in relation to the axis of the part.

It is to be understood, however, that the invention is not limited to the specific disclosure, but when constructed in commensurate sizes and proportions may be adapted for support of spiral and spur gear units and machine elements of other character and different forms.

The object of the invention is to improve the construction of work holders and automatic centering fixtures, whereby they may not only be economically manufactured, but will be more efficient in use, possess maximum accuracy, be automatic in operation of centering and aligning and engaged part, uniform in operation to enable accurate duplication of finished work, having relatively few parts, and be unlikely to get out of repair.

A further object of the invention is to provide a chuck of the character mentioned which is adapted for quick and easy insertion and removal of the work parts and which will automatically center and axially align the inserted element.

A further object of the invention is to provide a duplex gear chuck wherein a pair of gears may be disposed in parallel concentric relation for machining and finishing operations.

A further object of the invention is to provide the herein described method of centering and aligning machine elements.

A further object of the invention is to provide a work holding chuck having the advantageous structural features and inherent meritorious characteristics and effective mode of operation herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein is illustrated the preferred but obviously not necessarily the only form of embodiment of the invention, Figs. 1 and 1a are perspective views of the cooperative parts of a chuck or work holder embodying the present invention, separated one from the other, preparatory to receiving the work part.

Fig. 2 is a perspective view of a duplex pinion member engageable in the chuck or work holder shown in Figs. 1 and 1a.

Fig. 3 is a longitudinal sectional view of the chuck or work holder assembled with the duplex pinion member therein.

Fig. 4 is a side elevation, partly in section, illustrating the adaptation of the invention to a machine element, wherein a gear and shaft are centered relative to the pitch circle of the gear and aligned with a distant axial center of the work element.

Fig. 5 is a detail view of a modification.

Like parts are indicated by similar characters of reference throughout the several views.

The chuck assembly, as shown in Figs. 1, 1a and 3, embodies a pair of bevel gear chuck bodies 1—1 which are somewhat similar to but not necessarily identical with the gear chuck forming the subject matter of Letters Patent No. 2,153,829, issued April 11, 1939. These chuck bodies are engageable with a duplex gear element comprising spaced bevel gear pinions 2—2, which are integrally interconnected by a hollow shaft 3. The chuck bodies 1 are provided with concave faces 4, in which are disposed a series of inclined tapered locating pins 5. The pins 5 are so shaped and relatively disposed within the concave faces of the chuck bodies that they engage between circumferentially spaced pairs of gear teeth of the pinions 2, accurately on the pitch circles thereof.

Obviously, if the machine elements to be located in the chuck or fixture embody other forms of gear pinions, or other shapes of shafts, hubs or extensions, the chuck bodies 1 will be correspondingly designed to conform thereto.

The chuck bodies 1—1a are mounted in spaced relation upon an arbor or mandrel 6, having an enlarged abutment head 7 and a terminal hub 8 formed integral therewith. The arbor 6 with its head 7 and hub 8 are quite accurately machined and finished, as are also the chuck heads. These parts are manufactured with such precision that the chuck bodies are held exactly parallel with each other and with their axes exactly aligned and with the gear locating pins 5, or other gear engaging elements, in an accurately concentric series.

The chuck bodies 1—1a are interchangeable on the arbor with other chuck bodies of different size, or adapted for engagement with work bodies of other types. The integral arbor head 7 is connected with one of the chuck bodies for unison rotation by a driving pin or stud 9 carried by one member and having engagement in a corresponding hole in the other member. The chuck body 1a at the opposite end of the arbor is removable to enable placement and removal of the work member 2—3. The latter chuck body 1a is mounted on a bushing or thimble 10 engageable over the arbor spindle 6, and with which it is engaged for unison rotary and axial adjustment by a screw stud 11. Screw threaded upon the end of the arbor 6 is a recessed thrust collar 12, which is recessed at 13 to receive the head 14 of the bushing or thimble 10. The latter is peripherally rabbeted at 15, forming an annular shoulder which is overhung by a radial stud 16 carried by the thrust collar 12. The thrust collar is formed with a central hub 17 which projects within a counterbore in the head 14 of the bushing 10 and exerts axial pressure thereon upon tightening adjustment of the collar. Upon retraction of the collar 12, the overhanging stud 16 by engagement with the peripheral shoulder of the bushing head 14 exerts retractive influence upon the bushing and upon the gear chuck 1a connected thereto, to release the engaged work part. The inner end of the bushing 10 is beveled at 18 for automatic centering thrust engagement with the end of the work part in the event that it does not include a gear element engageable with the chuck. In such event, the gear chuck body 1a may be entirely removed and the thrust of the tapered sleeve 10 may be relied upon to center the work part, as illustrated in Fig. 4. For this purpose the terminal of the sleeve 10 may be either exteriorly or interiorly beveled to agree with the end of the work part to be engaged thereby.

The chuck body and associated bushing sleeve 10 having been removed from the arbor as in Fig. 1a, the work piece is telescopically thrust over the arbor or mandrel 6 and the chuck assembly, Fig. 1a, is restored, and the thrust collar 12 is engaged with the arbor. By tightening the thrust collar 12 upon the screw threaded extremity of the arbor, the work part is pressed longitudinally against the chuck body 1 to cause the locating pins of the latter to engage between the teeth of the pinion 2. The same thrust action of the collar 12 likewise presses the chuck body 1a against the opposite pinion 2 of the work part, forcing the locating pins of the chuck body into automatic centering relation with the engaged pinion of the work part. As before stated, the locating pins or studs of the respective chuck bodies are quite accurately shaped and positioned to engage the respective gear pinions upon the pitch lines thereof.

Such chucks are so designed as to support the gear pinions only in accurate concentric relation with the chuck bodies and in planes perpendicular to the axes thereof. That is to say, the bearing points of the gear pinions upon the chuck bodies are so disposed that the axis of the work part, Fig. 2, will exactly coincide with the axes of the respective chuck bodies, and hence exactly concentric with the axis of the arbor. The arbor is adapted to be mounted upon centers of a machine tool, such as a cylindrical grinder or other shaping or finishing machine. Even though the gear pinions 2 be not initially concentric with the intermediate shaft portion 3, when finished they will be accurately reformed to such relationship and all other surfaces brought into concentricity with the pitch circles of the gear pinions.

In the event that the work part is elongated but devoid of a second gear pinion, the sleeve 10 cooperates with the chuck body at the opposite end thereof to axially align the work member. Inasmuch as machine elements which necessitate accurately centered and axially aligned finished surfaces are of great variety of shapes and sizes, the chuck assemblies therefor must necessarily comprise many different shapes and sizes, which, however, embody the same dominant features and characteristics and operate in the same manner as that illustrated and described herein.

Many gear elements for which arbor type chucks are required have a gear body at one end only. Sometimes such gear elements lack either chambers or hubs as shown in the drawings or having either a chamber or a hub it may be unwise to use such feature as a locating means since it may prevent the gear seating accurately upon the chuck at the opposite end of the element. Such condition may result from distortion incident to hardening or to inaccurate machining. Inasmuch as the pitch circle of the gear body is the accepted basic or controlling factor and all finishing operations are performed concentric therewith, it is sometimes desirable to provide thrust pressure necessary to seat the gear body solidly upon the chuck without necessarily exerting any centering or locating influence.

This may be effected by a clamp nut on the threaded end of the arbor having a loose or "sloppy" fit, but is preferably effected by a floating thrust collar such as that shown at 10a in Figure 5. The collar 10a abuts against the end of the gear element, but being capable of limited wobble movement it readily accommodates itself to misalignment of the gear element being chucked. In such instance the thrust sleeve 10 may be loosely engaged therewith for relative rotary motion of the sleeve 10 and thrust collar 10a by a stud 19 engaging in a peripheral groove 20 of the thrust collar, which is thus free for any necessary movement in to askew position.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A work holder, including an arbor, a pair of gear chucks mounted thereon for axial adjustment one relative to the other, locating projections upon the adjacent faces of the gear chucks engageable with the teeth of an interposed duplex gear element coincident with the pitch lines thereof for relatively centering and aligning the duplex gear element with said chucks and with the arbor, a head upon the arbor against which one of the chucks abuts, a thrust collar screw threaded upon the arbor in abutting relation with the other gear chuck for relatively adjusting the gear chucks to clamp the interposed duplex gear therebetween.

2. A work holder, including an arbor, a pair of gear chucks mounted thereon for axial adjustment of one relative to the other, locating projections upon the adjacent faces of the gear chucks for engagement with the teeth of an interposed gear element, a bushing sleeve in one of the chucks having a tapered extremity projecting beyond the face of the chuck, the chuck and tapered bushing being selectively engageable with an interposed gear element one to the exclusion of the other, and adjusting means common to the chuck and tapered bushing for effecting thrust engagement of the selected member with a gear element interposed between the gear chucks.

3. In a work holder, a gear chuck, locating members carried thereby for engagement with a work piece, a mounting therefor including a bushing sleeve for the chuck having a tapered extremity projecting beyond the face of the chuck, the chuck and the tapered bushing sleeve being selectively engageable with a work piece, and a thrust member common to the gear chuck and the tapered bushing sleeve operative to axially adjust the selected one thereof into engagement with a work piece.

4. In a work holder, a mandrel having a screw threaded extremity, a stop collar on the mandrel in spaced relation with its threaded extremity, a work chuck mounted on the mandrel in abutting relation with the stop collar, a second work chuck mounted on the mandrel in spaced relation with the first mentioned chuck, and axially adjustable upon the mandrel to clamp a work piece between the chucks, a bushing sleeve for one of the chucks projecting beyond the face of the corresponding chuck for engagement with a work part in lieu of engagement thereof by the chuck, and means for axially adjusting the chucks and bushing sleeve upon the mandrel into and out of engaging relation with a work part interposed therebetween.

5. In an automatically centering chuck for a duplex gear element, an arbor, a pair of gear chucks disposed thereon in spaced axially aligned opposed relation with each other, having portions thereon for interlocking engagement with the teeth of an interposed double faced gear element, and clamp means engageable with the arbor for axially adjusting the gear chucks into clamping engagement with the interposed gear element.

JOHN R. GARRISON.
RALPH P. GARRISON.

REFERENCES CITED

The following references are of record in the file of this patent:

UNITED STATES PATENTS

| Number | Name | Date |
| --- | --- | --- |
| 1,854,618 | McGrady | Apr. 19, 1932 |
| 1,873,752 | Fraser | Aug. 23, 1932 |
| 1,937,726 | Steiner | Dec. 5, 1933 |
| 2,039,711 | Einstein | May 5, 1936 |
| 2,110,931 | Dyer et al. | Mar. 15, 1938 |
| 149,929 | Henry | Apr. 21, 1874 |
| 1,998,919 | Ball et al. | Apr. 23, 1935 |
| 897,937 | Small | Sept. 8, 1908 |
| 1,036,994 | Garvin et al. | Aug. 27, 1912 |